United States Patent
Niedereder et al.

(10) Patent No.: US 6,797,921 B1
(45) Date of Patent: Sep. 28, 2004

(54) WELDING UNIT EQUIPPED WITH A COMMUNICATIONS INTERFACE AND METHOD FOR OPERATING THE WELDING UNIT

(75) Inventors: Franz Niedereder, Fischlham (AT); Heinrich Hackl, Ried/Traunkreis (AT); Manfred Wittman, Rutzenmoos (AT); Anton Lauber, Weisskirchen (AT); Peter Mair, Wels (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 10/049,787

(22) PCT Filed: Aug. 16, 2000

(86) PCT No.: PCT/AT00/00221

§ 371 (c)(1),
(2), (4) Date: Feb. 15, 2002

(87) PCT Pub. No.: WO01/12374

PCT Pub. Date: Feb. 22, 2001

(30) Foreign Application Priority Data

Aug. 16, 1999 (AT) .............................................. 1408/99

(51) Int. Cl.[7] ................................................. B23K 9/10
(52) U.S. Cl. .................................................. 219/130.5
(58) Field of Search ..................... 219/130.5, 130.01, 219/136, 137 PS; 700/9

(56) References Cited

U.S. PATENT DOCUMENTS 5,805,442 A * 9/1998 Crater et al. .................... 700/9
5,808,885 A     9/1998 Dew et al.
5,850,066 A     12/1998 Dew et al.
5,981,905 A * 11/1999 Ohmi et al. ............ 219/130.01
6,002,104 A * 12/1999 Hsu ......................... 219/130.5
6,267,291 B1 * 7/2001 Blankenship et al. ....... 219/136

FOREIGN PATENT DOCUMENTS

EP         463489   * 1/1992
EP       0 825 506    2/1998

OTHER PUBLICATIONS

Rippey et al. "The NIST Automated Arc Welding Testbed", Proceedings of 7th International Conference on Computer Technology in Welding, San Francisco, CA, Jul. 1997, pp. 1–8.*

T. Johnson, (Jul. 1997) "Implementation of computer systems for production and QA/QC in the Öresund link bridge project", 7th International Conference on Computer Technology in Welding, pp. 42–53.

* cited by examiner

*Primary Examiner*—Clifford C. Shaw
(74) *Attorney, Agent, or Firm*—Collard & Roe, P.C.

(57) ABSTRACT

The invention relates to a welding device (1) having a current source (2) for supplying electrical energy to at least one electrode and a control and/or evaluation unit (4) co-operating with the current source (2), having an input device (57) for setting various welding parameters, characterised in that a communications interface (23) connected to the control and/or evaluation unit (4) is provided in order to set up a two-way data exchange between the welding device (1) or the current source via a web-server, in particular a HTTP server.

38 Claims, 3 Drawing Sheets

WELDING UNIT EQUIPPED WITH A COMMUNICATIONS INTERFACE AND METHOD FOR OPERATING THE WELDING UNIT

Applicants claim priority under 35 U.S.C. 119 of Austrian Application No. A 1408/99 filed Aug. 16, 1999. Applicants also claim priority under 35 U.S.C. 371 of PCT/AT00/00221 filed Aug. 16, 2000. The international, application under PCT article 21(2) was not published in English.

The invention relates to a welding device having a current source for supplying electrical energy to at least one electrode and a control and/or evaluation unit, cooperating with the current source. The evaluation unit has an input device for setting various welding parameters. There is also a communication interface connected to the controller evaluation unit to set up a two-way data exchange between the welding device or the current source via a web server such as a HTTP server. The invention also relates to, a method of operating a welding device as well as a control and/or evaluation system for a welding device.

A welding control system for a welding device is known from patent document U.S. Pat. No. 5,850,066 A, in which the welding device is able to retrieve data from a data bank via a network. This being the case, the welding device is connected to a network, in particular a computer network, by means of a communications interface, in particular a RS 232, so that corresponding data located in the network can be downloaded from a computer or a data bank via this data connection. The disadvantage of this system is that only one location-related data exchange can be operated with other components, such as a data bank or a computer.

Also known from the report entitled "Implementation of computer system for production and QA/QC in the Öresund link high bridge project", is the idea of using a computer system for quality assurance and for documentation purposes. In this computer system, welding drawings, test protocols, etc., are produced, entered and stored, in particular on a server, and can then be retrieved by another computer via a modem. The disadvantage of this system is that the data transferred via the computer can be retrieved by one other computer only, after which the devices, in particular the welding devices, have to be configured by skilled personnel on the basis of the transferred data.

A system is known from patent document EP 0 825 506 A2, whereby several clients are able to access a remotely disposed server via the internet or via an intranet and run a corresponding data exchange. A server is installed upstream of the terminal devices, to which the individual terminal devices are connected via a bus system. The way in which the data transfer is operated is that external devices link up to the server, which in turn communicates with the terminal devices linked by the bus system.

Methods of controlling welding devices and current sources as well as a control system needed for this purpose are known, in which various welding parameters such as a welding current, an additive, a welding method, etc., can be set from an input and/or output device and the control system operates the individual components of the welding device on the basis of the set welding parameters so that a user can start a corresponding welding process.

The underlying objective of the present invention is to propose a welding device and a method for operating a welding device, which can be remotely operated and by means of which status data can be determined remotely and maintenance carried out remotely.

SUMMARY OF THE INVENTION

The invention relates to a welding device having a current source, at least one electrode, a control and evaluation unit, an input device, a communications interface, a sensor system and a HTTP server in communication with the control and evaluation unit. The advantage of this system is that data can be forwarded to the welding device from a remote site and a data reading relating to the welding device or a welding process can be taken and transmitted over long distances. By incorporating a web server or HTTP server of the type known from the prior art, standardised software programmes can be used for the two-way data traffic, thereby ensuring compatibility with a whole range of connection possibilities such as data banks and the most varied of communication partners and communication equipment. Another advantage resides in the fact that this option of transmitting data remotely means that maintenance and software updates can be run remotely, as can access to external welding data banks in which special welding processes on welding settings are stored, thereby saving on the high travelling coat involved in sending a service engineer out.

The term data is intended to include software programmes which can be selectively forwarded to the welding device or read from it, providing an effective means of amending configurations, searching for errors and controlling and monitoring the welding device. In particular, all the information or data of a welding process to be run can be fully accessed from the welding device, which enables faulty conditions to be avoided and provides an easy way of assessing the quality and productivity of the welding process. Moreover, it is possible to set up a central control or operating or monitoring system for several welding devices so that the welding engineer can concentrate on his main job since settings can be entered and the welding device monitored from a central point or alternatively from several remote sites. The option of being able to manage and monitor the welding device and the welding processes from a central site or alternatively from several different remote sites allows the system to be automated, which can increase the quality and productivity of welding jobs. Servicing and order processing are simplified in particular and can be operated much more quickly, whilst the welding device can be maintained and configured remotely. Furthermore, online help services can be accessed through the communications interface which means that it will not usually be necessary to stop work or to leave the working area.

In one embodiment, the HTTP server can be disposed adjacent to the welding device or in the current source, in another embodiment the HTTP server can be disposed external to the welding device or current source. This HTTP server can establish a connection to a primary network such as the Internet or an Intranet for data exchange with another HTTP server. These designs are of advantage because they provide an easy means of connecting into an already existing or configured network.

Another embodiment of the invention is that the control or evaluation unit is a computer unit which operates via software modules of a control program and processes and prepares received data and/or data to be transmitted. This design has advantages since it offers a welding device which can be readily adapted to the individual requirements of the user and is also flexible if any changes have to be made subsequently.

The invention can also include a communications interface that is a TCP/IP interface that enables a communication to be operated using the TCP/IP protocol. An advantage of this embodiment is that it enables the welding device to be connected into data transmission networks covering a wide area, which means that virtually everybody will be able to benefit from the advantages of the welding device proposed by the invention.

In this case, the communications interface can be designed to link into a local area network such as the Internet, or to a global network such as the Internet. With this embodiment, welding process data or settings specific to the internal company or worldwide can be transmitted to a specific welding device or from a specific welding device.

Also of advantage is an embodiment wherein the welding device has a control or evaluation unit that has a standardized interface wherein the welding device is connected with a coupling device on the network by a communication device such as a modem or a network card. This feature is beneficial, since the welding device may be docked into the primary network or separated from the primary network in full security.

In the embodiment described above, the standardized interface can be a serial interface such as a RS 232 interface. The advantage of this embodiment is that the welding device can be connected to standard commercially available PC-compatible components, which means that its functions can be significantly increased whilst reducing on hardware costs.

With the embodiment of the welding device having a modem, the connection with remote communication partners or communication system is effected via a tried and tested, very widely used communication means.

An embodiment that includes data for welding processes that can be downloaded for additional configuration of the welding device enables welding processes to be monitored seamlessly and influenced at any time. In addition, the welding device may be re-configured or now settings entered using smaller quantities of transmission data in the form of codes. These re-configurations or new settings for the welding device can be handled particularly rapidly, inexpensively and securely since the smallest quantities of data are transmitted in the form of codes used to select specific data and programme packages stored in the memory system of the welding device.

In an embodiment wherein the data relating to operating supplies such as quantity or nature of the welding electrode includes a fusable welding wire, an inert gas, and/or data relating to components susceptible to wear such as a contact sleeve, a gas nozzle or similar type device may be transmitted or retrieved from other network participants via the network. This embodiment has the advantage that since any stoppage of the welding device due to a lack of operating supplies can be virtually ruled out, and data uploads can be left to run automatically, this design virtually obviates the need for human supervision.

In another design, features such as the duration of use, or other welding settings may be retrieved from at least one other network participant and transferred to another network participant. This type of embodiment enables the quality and productivity of the welding process to be monitored from globally dispersed sites or at a production site, allowing steps to be taken if necessary to optimise the system.

Another embodiment of the invention involves a design wherein the input device is set up to operate the welding device and select or navigate the data and select data files for welding technology. This type of design has been found to be of advantage since the input device can be used for multiple functions and the application of the input device is basically standard so that there is no need for special training.

Another embodiment of the invention involves data managed by the control or evaluation unit so that data entered by the input device or retrieved from the primary network can be displayed or indicated by signals on an output device cooperating with the welding device. This design defines an embodiment which makes it easier for the user to operate the welding device and monitor the welding device.

Another embodiment of the invention reveals that the control and/or evaluation unit comprises a personal computer which has an optical output device such as a monitor. This design has proved to be of advantage since it enables the wedding device to be built relatively inexpensively and made ready for use at any time.

In another embodiment the software modules are formed as object oriented programming language and are of advantage because the software programme is clearly structured and can be divided into a logical programme element and modules for managing and controlling the components of the welding device.

Another embodiment enables the individual software modules to be loaded subsequently at any time and these new software modules to be seamlessly integrated in the programme sequence.

In another embodiment of the invention, the control or evaluation unit is designed to operate the software modules on a cyclical or interrupt control controlled basis. This embodiment defines an advantageous embodiment which makes it possible to respond very rapidly to safety critical states depending on the respective priority of the states that have occurred or are prevailing.

An embodiment of the invention is also disclosed wherein the software modules are written in JAVA source language, wherein the control or evaluation unit has a JAVA interpreter that can be operated to read the JAVA source language. This type of design is of advantage because a network-optimised programming language is selected, which is independent of the corresponding target hardware and independent of the machine code of the target hardware and can therefore be widely distributed without a knowledge of the target hardware.

In another embodiment, JAVA based processor can be used, wherein this is of advantage because it obviates the need for JAVA interpreters and shortens the system running times.

In another embodiment, there is a communications interface that is designed to set up a wireless data transmission route to the desired communication transmission system or communication partner. This embodiment is advantageous because the welding device is mobile almost without restriction and the connection to the respective network participant or communication device can still be maintained.

In another embodiment, the communication interface can be an infrared interface for transmitting or receiving infrared signals between the welding device and a mobile telephone. With this design, there is no need for cable connections to integrate the welding device in a primary data network and there is no problems using tried and tested, functionally secure components.

In another embodiment, the communications interface is designed to connect directly or indirectly via a network with a programming display unit provided as a stand-alone unit. This embodiment defines an advantageous embodiment since it enables servicing operations, remote analyses, status investigations, configuration changes and similar to be operated in a simple manner.

The objective of the invention is also independently achieved by a method of operating a welding device wherein this method includes the steps of controlling an energy source via a control or evaluation unit to apply electrical energy to at least one electrode. This control and evaluation unit can process software modules and operates on the basis of a pre-set set of instructions and any specific settings entered. With this design, there is a communications interface wherein software modules or data can be sent to a web server, such as a HTTP server or retrieved from a web server such as a HTTP server, The advantage of this approach is that the welding device can be re-configured particularly quickly and very conveniently and the welding process being run on the welding device can be monitored on a fully automated basis, as can monitoring of the status of the welding device itself. Another advantage resides in the fact that the data bases can be centrally maintained, which means that the software modules to be processed are constantly kept up to date. Furthermore, it is an easy matter to store the respective data on a decentralised basis, thereby protecting against loss.

A feature of this method can be that the software modules that run or control the evaluation unit are determined by codes transmitted by a network. This design is of advantage because the load on the network can be kept very low and the welding device can also be adapted particularly quickly.

Another design, is such that the method includes the steps of transmitting the operation data relating to operating supplies operating statuses or similar such that this can be transmitted to other network participants or retrieved by other network participants via the web server. This process also includes the step wherein the evaluation circuit controls a welding process that the resultant data is transmitted to other network participants. This process is of advantage, enabling stoppages or down-time of the welding device to be largely avoided and providing a means for assessing the quality and productivity of the welding process from a central site.

A variant of this method is that the messages or service requests which relate to stocks of operating supplies and/or orders of operating supplies can be downloaded from the control or evaluation unit to other network participants. This feature is of advantage because it ensures that the welding device is provided with operating supplies as and when needed, obviating the need to keep a stock of operating supplies or spare parts for the welding device. Automation also makes the system highly reliable.

Finally in another method, the device can use a local area network such as an Intranet or a global network such as the Internet to load or transfer data or software modules In this case, the feature is of advantage because the benefit of the welding device proposed by the invention can be used virtually anywhere and by anybody without restriction, which means that it will be widely used and gain a high degree of acceptance.

The objective of the invention is also achieved by the features of the invention wherein a control or evaluation unit has a communications interface that can connect to a primary network.

BRIEF DESCRIPTION OF THE DRAWINGS

The advantages of this embodiment will be explained in the description in more detail on the basis of examples of embodiments.

The invention will be described in more detail with reference to the examples of embodiments illustrated in the appended drawings.

Of these.

DETAILED DESCRIPTION

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIGS. 1 to 4 illustrate a welding system or a welding device 1 for running a whole variety of welding processes, e.g. MIG/MAG welding and TIG or WIG welding. The welding device 1 comprises a current source 2 with a power component 3, a control and/or evaluation unit 4 and a switching element 5 co-operating with the power component 3 or the control and/or evaluation unit 4. Connected to the switching element 5 or the control unit 4 is a control valve 6, disposed in a supply line 7 for a gas 8, in particular an inert gas such as carbon dioxide, nitrogen, helium or argon and such like, between a gas storage 9 and a welding torch 10.

A wire feed device 11 may also be activated via the control and/or evaluation unit 4, in which case a welding wire 13 will be fed from a supply drum 14 via a supply line 12 into the region of the welding torch 10. The current needed to generate an arc 15 between the welding wire 13 and a workpiece 16 is fed via a supply line 17, 18 from the power component 3 of the current source 2 to the welding torch 10 and the welding wire 13.

Clearly, the wire feed device 11 may also be integrated in the housing of the welding device 1, instead of being provided as a separate device, forming a compact, single-piece unit in the standard manner. Furthermore, in addition to supplying the welding wire 13 from a supply drum 14, it is possible to set up welding devices 1 as proposed by the invention to process bar electrodes. Moreover, the design proposed by the invention may be used on welding devices 1 without fusible electrodes, in particular on welding devices 1 for resistance welding processes or friction welding processes.

Consequently, the design of welding devices 1 proposed by the invention is not dependent on welding methods, nor does it depend on the use of an inert gas atmosphere.

In order to cool the welding torch 10, it may be connected to a water container 21 via a cooling circuit 19, with a flow indicator 20 connected in between, so that when the welding torch 10 is switched on, the cooling circuit 19 is activated by the control and/or evaluation system 4 so that the welding torch 10 and a gas nozzle of the welding torch 10 are cooled. Naturally, it would also be possible to use an external cooling circuit 19, in a manner known from the prior art.

The welding device 1 additionally has an input and/or output device 22, by means of which a whole range of welding parameters or operating modes of the welding device 1 can be set. The welding parameters entered at the input and/or output device 22 are forwarded to the control and/or evaluation unit 4. The individual components of the welding device 1 are activated on the basis of these settings. To this end, it would also be possible for the welding device 1 to be connected to an external input and/or output device 22 which can be switched on as required, such as a computer, a PLC or an operating unit, etc.

Figure 2:
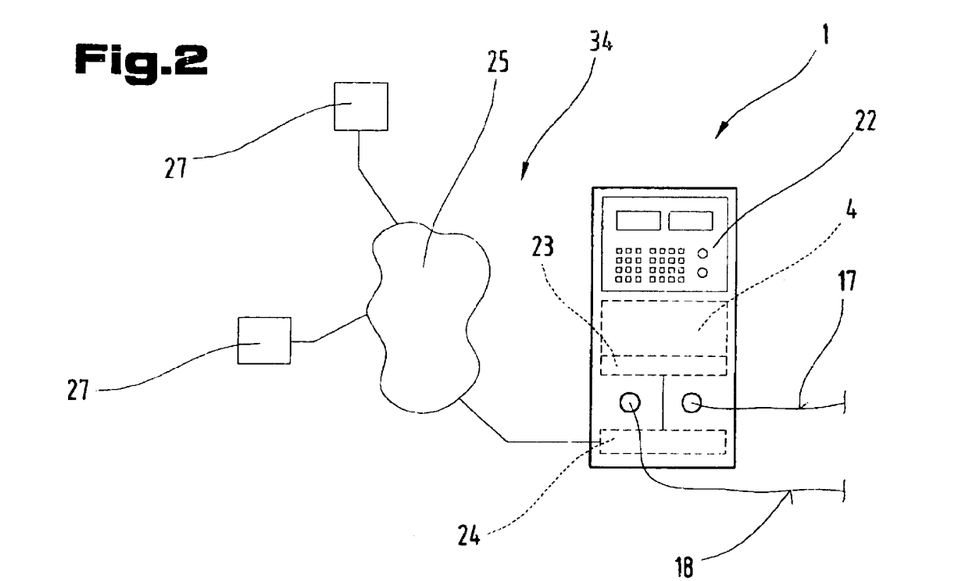
FIG. 2 is a very simplified diagram of a welding device.
Figure 3:
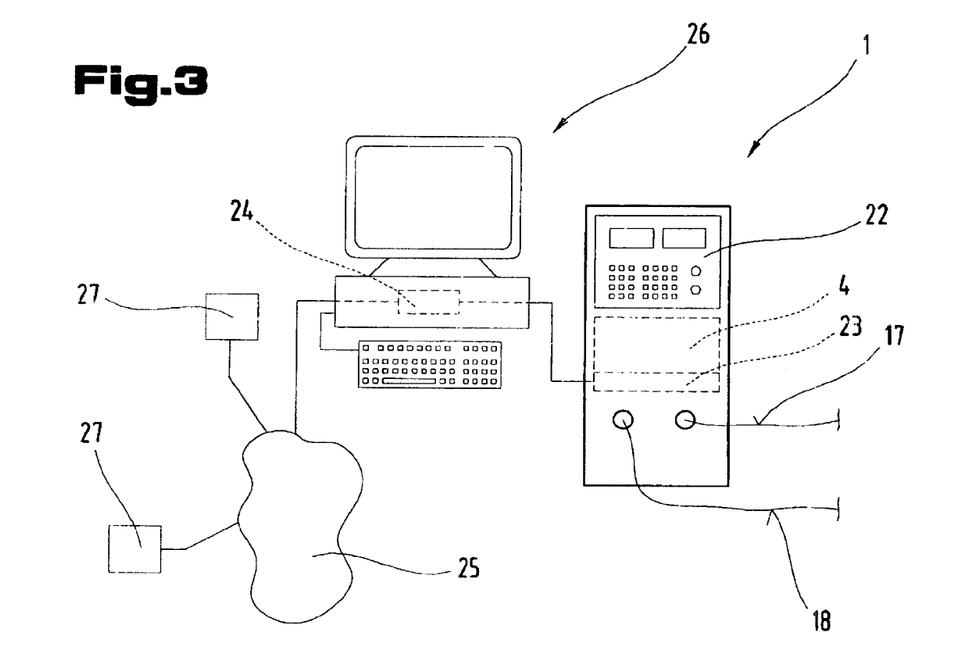
FIG. 3 is a very simplified diagram of another embodiment of a welding device.

The control and/or evaluation unit 4 is connected to at least one communications interface 23, as may be seen more clearly from FIG. 2, so that a two-way data exchange can be run between the welding device 1 or the current source and a web server, in particular a HTTP server 24, i.e. a communications interface 23 is provided as a means of transferring data to the welding device 1 or from the welding device 1, this system being set up to establish a connection with a web server, in particular a HTTP server 24, either wirelessly or on a hard-wired basis. Consequently, the welding device 1 is set up so that it can at least receive data via the communications interface 23 from a primary network 25 or a data transfer can be run from the primary network 25. By preference, however, the communications interface 23 of the welding device 1 is configured so that electronically processable data can be both received and transferred or transmitted, enabling a two-way data transmission route to be set up between several network participants. If necessary, it would also be conceivable to set up the communications interface 23 so that is can only send or transfer data of the welding device 1 to other participants in the network 25 located at remote sites.

The web server, in particular the HTTP server 24, is disposed in the welding device 1 or the current source 2. Clearly, it would also be possible for the web server, in particular the HTTP server 24, to be disposed externally to the welding device 1 or the current source 2, in particular in a computer or personal computer 26, i.e. a direct connection can be established by connecting the communications interface 23 to an external device, in particular the personal computer 26, a laptop, a networked computer system etc., on the web server, in particular the HTTP server 24, as may be seen from FIG. 3.

The web server, in particular the HTTP server 24, is set up in such a way that it will establish a connection with the primary network 25, in particular the INTERNET and/or an INTRANET, so that data can be exchanged with one of many other web servers, in particular a HTTP server 27 or another communication transmitter linked to the HTTP server 27. This being the case, the other HTTP server 27 may in turn be set up through a welding device 1 with the HTTP server 24 in a manner similar to the embodiments illustrated in FIGS. 2 or 3 or the stand-alone personal computer 26. The advantage of operating a data transfer in this manner is that servicing no longer has to be carried out on site. Furthermore, inexpensive adaptations can be made to the welding device 1, in particular software modifications or software updates, without a service engineer having to be present on site.

The communications interface 23 of the welding device 1 is preferably provided in the form of an interface to a standard data transmission network, in particular to a hard-wired data transmission network. The welding device 1 may be connected to the primary network 25 by means of a network cable 28, which will establish the electrical connection between the communications interface 23 and the HTTP server 24 and an external network interface 29, in particular a network socket 30.

Instead of providing a hard-wired connection between the welding device 1 and at least one other communication transmission system, it would also be possible to set up a wireless data transmission route. This being the case, the data transmission may be operated by radio via electromagnetic waves or alternatively on an optical basis, preferably using infrared signals. If using optical data transmission, the communications interface 23 will be set up to operate in conjunction with an interface for transmitting and/or receiving infrared signals, having a communication system specifically configured to communicate with an interface for transmitting and/or receiving infrared signals, in particular the interface of a mobile telephone for transmitting and/or receiving infrared radiation. To this end, the HTTP server 24 may be directly integrated in the communications interface 23 or a wireless data connection established with the HTTP server 24. In this case, the welding device 1 or the mobile telephone will be connected to the desired communications transmitter and extended via the public telephone network.

Clearly, it would also be possible to set up the optical communications interface 23 of the welding device 1 to operate with the corresponding optical network interface 29, in which case the corresponding data would be transmitted to the optical network interface 29 wirelessly and then forwarded to the primary network 25 by wire. The transfer of data from the network 25 to the welding device 1 may be operated on a similar basis. The crucial factor if using an optical network interface 29 is to ensure that there is a sight connection between the optical communications interface 23 of the welding device 1 and the optical network interface 29, which can be achieved by positioning the welding device 1 accordingly.

If data transfers are operated on the basis of an optical or electromagnetic system via a mobile telephone with an interface for transmitting and/or receiving infrared radiation, it will merely be necessary to set up the dial-up connection to the desired communication transmission system and link the interface of the mobile telephone for transmitting and/or sending infrared radiation to the optical communications interface 23 on the welding device 1 and initiate the desired connection structure.

The primary network 25 may be set up to operate through an electrical network 25 only or alternatively through an optical network for transmitting optical signals, to take advantage of high data transmission rates and low susceptibility to interference from electromagnetic fields.

The network 25 set up to communicate between several network participants or communication devices may be based on a local area network 31 (LAN) internal to the company and/or on a global network 32 linking various sites (WAN). It would also be possible to link the local area network 31 into the wide area network 32 or to couple the networks 31, 32 with one another.

For transferring data to the local area network 31, it is preferable to use standardized TCP (Transmission Protocol) or IP (Internet Protocol) as the communication protocols. Accordingly, the communications interface 23 of the welding device 1 is a TCP/IP interface. The local area network 31 is therefore preferably set up as an INTRANET network or another network built on the TCP/IP protocol system. For example, the network 25 might be set up as an ETHERNET or ARCNET system.

As may be more clearly seen from FIGS. 1 to 4, the welding device 1 can be connected via the communications interface 23 and the HTTP server 24, 27 into the wide area network 32 either directly or indirectly via the local area network 31. The communications interface 23 is therefore designed to link into an INTRANET 33 and/or directly into the INTERNET 34. The wide area network 32 is preferably based on the known INTERNET 34 which enables communication with any communications devices distributed worldwide but selectively addressable, all having HTTP servers 24, 27, through the TCP/IP protocol.

Figure 4:
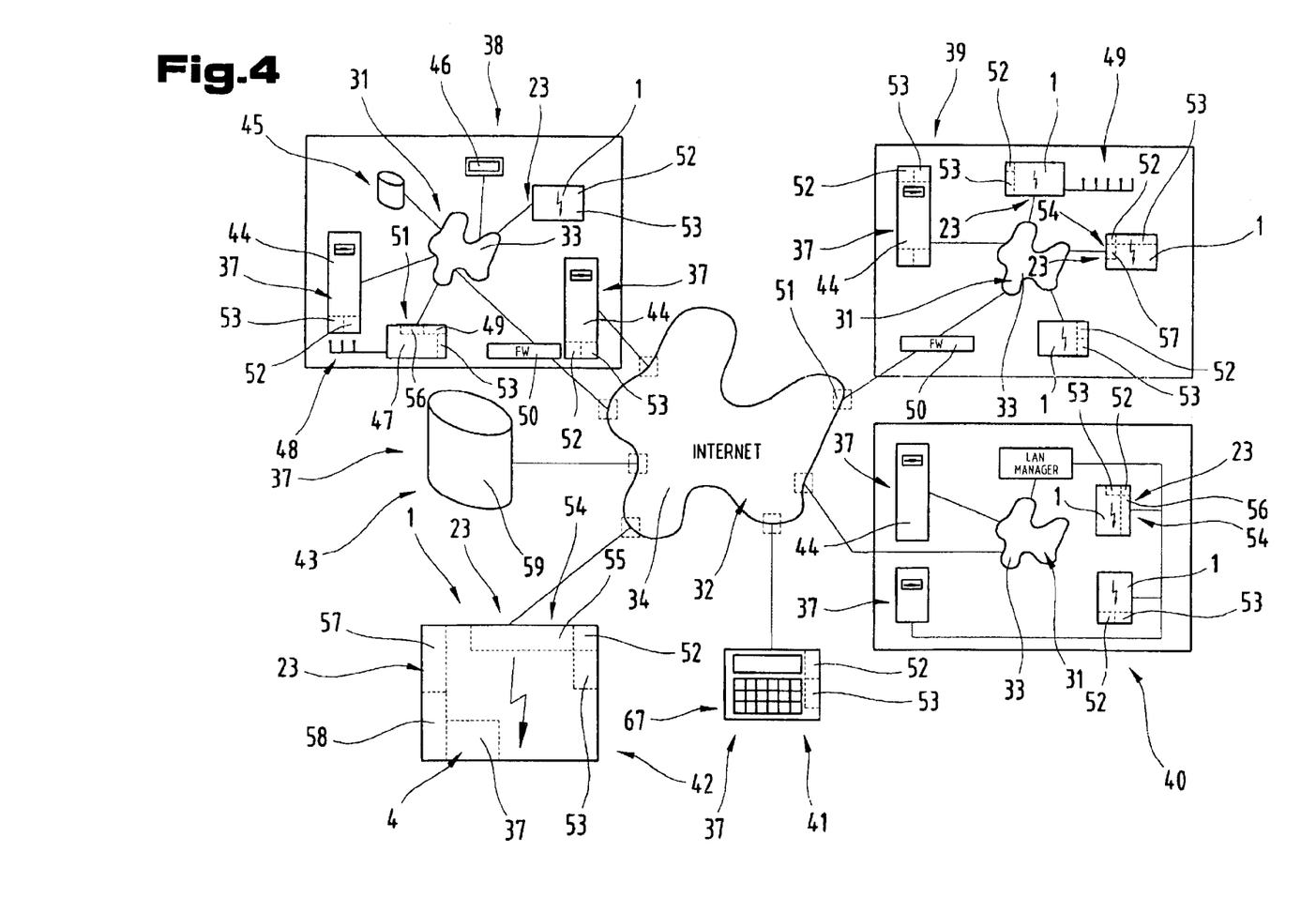
FIG. 4 is a very simplified diagram of several data processing systems and welding devices networked with one another from globally dispersed sites with an internet connection.

FIG. 4 in particular provides a very simple illustration of one possible communications set-up between several welding devices 1 and other network participants or other communication devices.

The control and/or evaluation unit 4 of the welding device 1 may be or incorporate a standard, commercially available computer unit 35, in particular a personal computer 36. The computer unit 35 or personal computer 36 in the welding device 1 will have the standard communications interface 23 with the HTTP server 24 for communicating with freely selectable communication devices also fitted with the HTTP server 24 or 27 in the primary network 25.

The various welding devices 1 and network participants 37 are deployed at globally distributed user sites 38 to 43, it also being possible for a plurality of welding devices 1 and network participants 37 at the respective user sites 38 to 43 to communicate with one another.

Each of the user sites 38 to 40 has a respective local area network 31, to which the welding devices 1 and other network participants 37 are linked and therefore able to exchange data with one another.

By network participants 37 is meant conventional personal computers 44, data storage systems 45, simple data display units 46 such as terminals and automation systems 47 or programmable logic controllers (PLC) for automating any technical or industrial process sequences. The automation systems 47 will have a plurality of inputs and/or outputs via which the process to be automated can be monitored and controlled. Conventional field bus systems 48 will be used to connect the automation system 47 to the devices to be controlled. This being the case, the automation system 47 may control a welding robot, in which case the welding device 1 will the welding robot.

Similarly, the welding device 1 may also have a sensor system 49, by means of which data relevant to a welding process can be detected during operation and forwarded to the welding device 1. The sensor unit co-operating with the welding device 1 may be designed to detect the welding current rating, temperature conditions, the burning depth, the characteristic features of the arc, guiding of the welding torch and similar. The welding process data picked up by the sensor system 49 used for assessing the quality or a welding process or for detecting current welding performance is transferred to the welding device 1, where it is prepared or optionally processed and can then be despatched to other network participants for evaluation via the communications interface 23 and the HTTP server 24 or selectively retrieved by other network participants 37, such as the personal computer 44 for example.

The local area networks 31 at the individual user sites 38 to 40 may be protected against external unauthorised access by means of a data protection device 50, known as a Firewall. This data protection device 50 is also designed to prevent unauthorised persons from entering data in the network 31 or in the welding devices 1 or network participants 37.

The welding devices 1 or the local area networks 31 are linked into the worldwide internet 34 via appropriate access systems 51, in particular what are known as Internet service-providers. A clearly distinguishable code or address 52 is allocated to each welding device 1 or each network participant 37 so that the respective welding device 1 or the respective network participant 37 can be selectively contacted or called as well as unambiguously identified from a plurality of welding devices 1 or network participants 37 if data is being downloaded. The address 52 or the so-called e-mail address is managed by the Internet service providers or by the respective access system 51 to the internet 34.

The control and/or evaluation system 4 of the welding device 1 is preferably provided in the form of a processor control, which operates on the basis of a predetermined sequential programme. The sequential programme may be made up of a plurality of software modules which together form the complete control programme. The control and/or evaluation unit 4 is set up to run the software modules in cycles and/or on an interrupt-controlled basis.

The software modules to be run by the control and/or evaluation system 4 may be permanently or temporarily stored in a memory system 53 of the welding device 1. This being the case, the memory system 53 may be made up of digital technology memory modules, a hard disk storage or other known data memory systems known from the prior art. In addition to the software modules to be run, process data or intermediate results of the processor control and pre-set characteristics may also be permanently or temporarily stored in the memory system 53.

It will then be possible, via the communications interface 23 or through the link into the network 25, to read data or software modules from the welding device 1 or transfer them to the welding device 1. In particular, the software modules to be run by the control and/or evaluation system can be replaced by new software modules transferred via the network 25. Consequently, once updated with the new software modules, the welding device 1 can be run on the basis of another sequential programme. This means that it will now be possible for other or modified functions to be set up on the welding device 1 via the network 25, thereby establishing a system of remote control or remote operation of the welding device 1.

Similarly, it is also possible to store a plurality of software modules or control programmes in the memory system 53 and selectively activate a new control programme on the basis of codes received via the network 25, which can then be run by the control and/or evaluation unit 4.

Similarly, data updates can be transferred across the network 25 to the welding device 1, these updates being activated from a remotely located site.

Through software updates and by transferring codes, it will therefore be possible to add to or reduce the functions of the welding device 1. For example, software modules updated to incorporate functions requested by the manufacturer of the welding device 1 can be transferred to the respective welding devices 1 at the customer sites and integrated in the control and/or evaluation unit 4 of the welding device 1. If the welding device 1 is incorporated in the network 25, the output capacity of the welding device 1 can be easily increased by the manufacturer, once the corresponding owner of the welding device 1 has settled the requisite fees. The capacity can be altered in many ways simply by adapting the control programme, so that various classes of output can be achieved with a specific hardware configuration advantageously enabling the manufacturer to increase the number of products processed without any detrimental effect on the number of types.

Likewise, remote maintenance operations can be run on globally distributed welding device 1 from a central site or from a manufacturing site of the welding device 1. In particular, remote diagnosis, remote error-searching and servicing or status checks of the welding device 1 can be operated remotely. Consequently, the reliability of the welding device and the quality of the welding processes operated with the welding device 1 can be guaranteed and stoppages of the welding device 1 prevented since faults can be detected early.

On the other hand, it would also be possible to forward all data for individual welding parameters or codes for an individual configuration of the welding device 1 via the network 25 and the communications interface 23 or read off this data from the welding device 1 in order to control the welding processes. Data relating to the operation of the welding device 1, such as the duration of use, operation timing, the welding settings or similar, can be retrieved by a network participant 37 or this data can be automatically transferred from the welding device 1 to other network participants 37 for processing or evaluation.

Likewise, it would also be possible to retrieve data relating to the operating supplies for the welding device 1, e.g. the quantity and/or the nature of the welding electrodes, the fusible welding wire 13, the inert gases used and similar, to be transferred via the sensor system 49 co-operating with the welding device 1 across the network 25 and the communications interface 23 or automatically transferred from the control and/or evaluation unit 4 to other network participants 37 for evaluation and a decision as to whether steps need to be taken. Data relating to parts of the welding device 1 susceptible to wear, e.g. the contact sleeve, the gas nozzle or similar, can also be selectively retrieved via the sensor system 49 across the network 25 or transmitted to at least one other network participant 37 either periodically or before a critical state is reached, enabling appropriate steps to be taken.

By networking the welding device 1 and by providing the sensor system 49, the control and/or evaluation unit 4 will also be able to make service recommendations or specify desired service times and specific service requirements. Furthermore, automatic messages about stocks of operating supplies or specific orders for operating supplies can be sent by the welding device 1 to specific network participants 37, e.g. a gas or welding wire supplier.

Data and software modules are preferably transmitted from the welding device 1 to the respective network participant 37 with a specific address 52 or vice versa via the INTRANET 33 within site-related regions or worldwide via the INTERNET 34.

In order to link the welding device 1 to the primary network 25, in particular the INTERNET 34, the control and/or evaluation unit 4 or its computer unit 35 has a standardized communications interface 23. The welding device 1 is connected via this communications interface 23 to a coupling device 54 in the form of an external or internal modem 55 or alternatively by an appropriate network card 56, for example.

If using an external modem 55 in particular, the standardized communications interface 23 of the welding device 1 or its computer unit 35 will be a serial interface, in particular a RS 232 interface.

An external communication can be set up across the network 25 by means of the coupling device 54 in the form of the modem 55 or the network card 56 provided in the welding device 1. The coupling device 54 provided in the welding device 1 in the form of the modem 55 can be used to establish an external connection or to make a dial-up connection across the telephone network for a reliable data transfer or to exchange data over a large area.

The welding device 1 is operated and/or controlled from the input and/or output device 22, in which case an input device 57 is provided as standard and an output device 58 may be provided as an option. Operation of the input and/or output device 22 may be menu-driven so that the user will not need any previous special knowledge of the system in order to be able to make a transfer over the INTERNET 34 or the INTRANET 33.

The input device 57 enables the welding device 1 to be operated and/or navigated in order to select specific data from the data base of a welding technology data bank 59. This technical data bank 59 may form part of the filing system of a remotely located data bank driver or alternatively may be a technical data bank 59 within the company containing data primarily relating to welding.

The input device 57 may have standard components such as a keyboard, a pointer device, a push-stick type control element or several operating elements in the form of rotating and/or sliding elements with keying and/or switching functions.

The optional output device 58 may also have standard components such as a monitor, a display or similar. Data retrieved from the primary network 25 and/or data managed by the control and/or evaluation unit 4 and/or data entered from the input unit 57 may be viewed using this output device 58. In addition or alternatively, the output device 58 may also have acoustic means so that relevant data or statuses can be indicated by signals.

The primary advantage of using the personal computer 36 as the control and/or evaluation unit 4 of the welding device 1 is that standard input and/or output devices 22 can be used, such as monitors and keyboards.

Similarly, a combined input and output device 22 may be used with the welding device 1, for example in the form of a touch screen, which will make it much easier for the welding engineer to use or adjust the welding device 1, whilst keeping space requirements to a minimum.

The control and/or evaluation unit 4 or the personal computer 36 of the welding device 1 has a sequencing system software module or a corresponding operating system. The software modules to be run by the computer unit 35 or the personal computer 36 of the welding device 1 are preferably of the object-oriented type. The software module for the sequencing system or operating system is designed to integrate the object-oriented software modules in the control programme. This being the case, the HTTP servers 24, 27 may also be based on a software module of this type, in which case this software module will be activated by the control and/or evaluation unit 4 in readiness for a data transmission enabling corresponding data to be received by or transmitted from the welding device 1.

The sequencing system software module may be stored in an EPROM memory module. Unlike hard disks, this non-volatile memory system 53 does not use magnetic data recording so that the likelihood of it causing interference, particularly in strong electromagnetic fields, e.g. in welding fields, is very low. Similarly, intermediate results or process data of the welding device 1 may be stored in a memory system 53 provided in the form of a RAM memory and/or EEPROM memory.

The control programme run by the control and/or evaluation unit 4 is preferably written using a programming language specially designed for network applications. The control programme and its software modules are preferably written in JAVA source language. In order to translate the JAVA source code, the control and/or evaluation unit 4 or the computer unit 35 of the welding device 1 will have a JAVA interpreter. This JAVA interpreter translates the JAVA source code into a format that can be processed by the target hardware, in other words the control and/or evaluation unit 4.

Optionally, the processor of the control and/or evaluation unit 4 or the computer unit 35 may be a JAVA processor, which will process the control programme written in JAVA directly.

Figure 1:
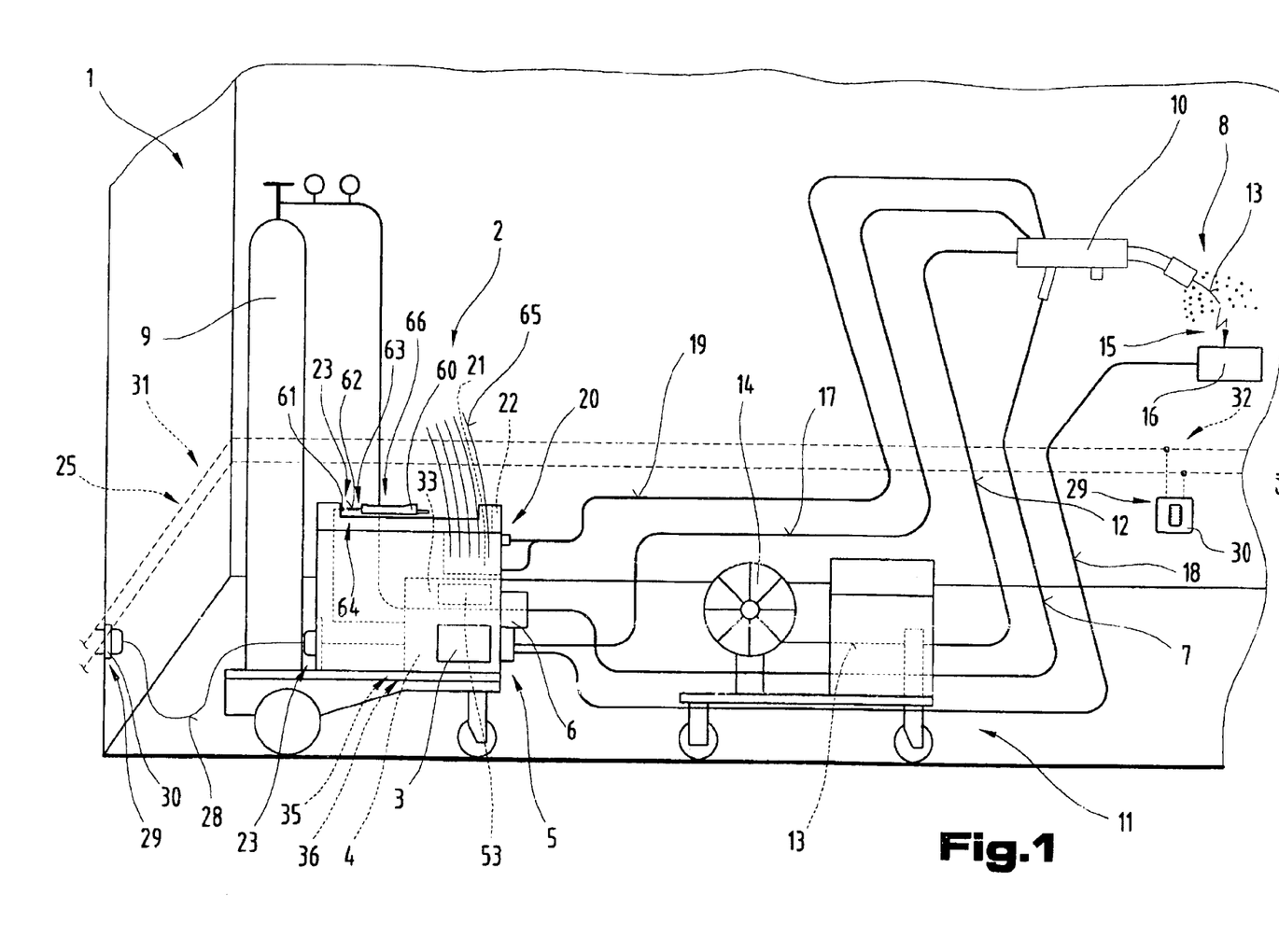
FIG. 1 is a very simplified, schematic diagram of a welding device coupled with a primary network for data transmission by wire.

As may best be seen from FIG. 1, the communications interface 23 of the welding device 1 may also be set up in the form of a wireless communications interface 23. This wireless communications interface 23 of the welding device 1 is designed to communicate with a mobile telephone 60, as explained earlier. The communications interface 23 is preferably an infrared interface 61 for transmitting and/or receiving infrared signals 62 representing the respective data. If the communications interface 23 is provided as an infrared interface 61, it will be set up in such a way that it is able to connect with the mobile telephone 60, in particular with an infrared interface 63 of the mobile telephone 60. A two-way or alternatively only a one-way data transmission route 64 can be set up between the infrared interface 61 of the welding device 1 and the infrared interface 63 of the mobile telephone 60, via which the respective data can be transmitted in the form of infrared signals 62. Clearly, it would also be possible for the mobile telephone 60 or a wireless modem to be integrated in the welding device 1 itself, enabling a connection to be set up at any time and at any site without the need for additional elements such as connecting cables or an additional mobile telephone 60.

The welding device 1 is connected to the primary network 25 via the mobile telephone 60, a dial-up connection being made across the public or a private telephone network to the respective communication transmission system or communication partner. It would also be possible to establish a direct connection with a communication partner without the primary network 25, for which purpose a data connection will be established between the two HTTP servers 24 and 27.

The respective welding process data, data for the parameter settings and software modules in this case are transmitted via electromagnetic waves 65, which can be emitted and received by the mobile telephone 60. The transmission of data between the mobile telephone 60 and the respective communication transmission system or communication partner may be made across a very large distance in a known manner.

The connecting structure between the mobile telephone 60 and the communication transmission system or communication partner is preferably initiated manually by the user of the welding device 1 using the keypad of the mobile telephone 60 to make a dial-up connection. The dial-up connection may optionally be to a servicing department, suppliers of operating equipment, technical data banks 59 and welding data banks containing the respective welding settings for the impending welding process or similar.

Instead of the mobile telephone 60, it would also be possible to use a stationary transmitter and/or receiver unit 66 mounted and installed in the welding device 1 as a means of transmitting and /or receiving electromagnetic waves 65.

As may best be seen from FIG. 4, a programming and/or data display unit 67 may optionally be connected to the welding device 1 or be placed in contact with it via the network 25. This programming and/or data display unit 67 is designed for entering data into the welding device 1 and/or for outputting and displaying data from the welding device 1. The programming and/or display unit 67 may also be linked into the primary network 25 so that a specific welding device 1 may be selected and called via the INTERNET 34 using its address 52. The programming and/or display unit 67, provided as a stand-alone unit, may also be directly connected to the welding device 1 via the communications interface 23. Furthermore, the programming and/or display unit 67 may also be used as a means of taking readings of faults and/or carrying out maintenance.

For the sake of good order, it should finally be pointed out that in order to provide a clearer understanding of how the welding device is built, it and its constituent parts are illustrated out of proportion and/or on an enlarged scale and/or on a reduced scale.

The objective of the invention and the independent inventive solutions proposed by the invention may be found in the description.

Above all, the individual embodiments illustrated in FIGS. 1, 2, 3, 4 may be construed as the subject matter of independent solutions proposed by the invention in their own right. The objectives and solutions proposed by the invention may be taken from the detailed descriptions of these drawings.

List of Reference Numbers

1 Welding device
2 Current source
3 Power component
4 Control and/or evaluation system
5 Switching element
6 Control valve
7 Supply line
8 Gas
9 Gas storage
10 Welding torch
11 Wire feed device
12 Supply line
13 Welding wire
14 Supply drum
15 Arc
16 Workpiece
17 Supply line
18 Supply line
19 Cooling circuit
20 Flow indicator
21 Water container
22 Input and/or output device
23 Communications interface
24 HTTP server
25 Network
26 Personal computer
27 HTTP server
28 Network cable
29 Network interface
30 Network socket
31 Network (LAN)

32 Network (WAN)
33 INTRANET
34 INTERNET
35 Computer unit
36 Personal computer
37 Network participant
38 User site
39 User site
40 User site
41 User site
42 User site
43 User site
44 Personal computer
45 Data storage system
46 Data display unit
47 Automation system
48 Field bus system
49 Sensor system
50 Data protection system
51 Access system
52 Address
53 Memory system
54 Modem
55 Modem
56 Network card
57 Input device
58 Output device
59 Technical data bank
60 Mobile telephone
61 Infrared interface
62 Infrared signal
63 Infrared interface
64 Data transmission route
65 Waves (electromagnetic)
66 Transmitter and/or receiver unit
67 programming and/or data display unit

What is claimed is:

1. A welding device in communication with a computer network comprising:
   a) a current source for supplying electrical energy to the welding device;
   b) at least one electrode in communication with said current source;
   c) a housing;
   d) a control and evaluation unit in communication with said current source disposed in said housing;
   e) at least one memory system disposed in said housing and in communication with said control and evaluation unit, said memory system for storing a set of welding parameters and a set of instructions for controlling said control and evaluation unit;
   f) a communications interface disposed in said housing coupled to said control and evaluation unit for two way data exchange between said control and evaluation unit and the computer network;
   g) at least one sensor system in communication with said communication interface for detecting data relevant to welding during operation of the welding device; and
   h) a HTTP server disposed of said housing and in communication with said communication interface wherein said HTTP server is for receiving information from the computer network including welding parameters and forwarding this information onto said control and evaluation unit and wherein said HTTP server is for receiving information from said communication interface in a form of welding parameters wherein this information is transmitted over the computer network to other computers wherein said HTTP server is for relaying information relating to the welding device while said control and evaluation unit is for controlling the welding device based upon this information from the server.

2. The device as in claim 1, wherein said HTTP server is integrated with said welding device and said current source.

3. The device as in claim 1, wherein said HTTP server is disposed external to said welding device and said current source.

4. The welding device as in claim 1, wherein said HTTP server forms a connection with a network which includes at least one additional HTTP server.

5. The welding device as in claim 4, wherein said network is in the form of the internet.

6. The welding device as in claim 1, wherein said control and evaluation unit is a complete unit which operates via at least one software module or a control program and processes and prepares received data or data to be transmitted.

7. The welding device as in claim 6, wherein said at least one software module can be downloaded via a local area network to said control and evaluation unit.

8. The welding device as in claim 6 wherein said at least one software module is an object oriented software modules.

9. The welding device as in claim 8, wherein said control and evaluation unit has a software module for a sequencing system or operating system for integrating the object-oriented software modules and processing control program.

10. The welding device as in claim 9, wherein said control and evaluation unit operates said software modules on a cyclical or interrupt-controlled basis.

11. The welding device as in claim 10, wherein said software modules are written in a JAVA source language.

12. The welding device as in claim 1, wherein said communication interface is a ICP/IP interface that enables communication to be operated using a TCP/IP protocol.

13. The welding device as in claim 1, wherein said communications interface is designed as a link to a local area network.

14. The welding device as in claim 1, wherein said control and evaluation unit has a standardized interface, and wherein said communications interface is a modem.

15. The welding device as in claim 1, wherein said control and evaluation unit has a standardized interface, and wherein said communications interface is a network card.

16. The welding device as in claim 15, wherein said control and evaluation unit is a standardized interface that is a serial interface in the form of a RS 232 interface.

17. The welding device as in claim 1, wherein said communications interface can be used to download or upload data for a welding process or welding codes.

18. The welding device as in claim 1, wherein said communications interface is used to transmit data relating to operating supplies and operating statuses including, the quantity and nature of a welding electrode, an amount of fusible welding wire, M level of any inert gas necessary for welding, or data relating to components susceptible to wear, a position of a contact sleeve, a position of a gas nozzle, wherein this information can be transmitted to other computers on the network via said communication interface.

19. The welding device as in claim 1, wherein said communications interface is in communication with the computer network to receive or transmit in cycles, data relating to the operation of the welding device including the duration of use, timing of usage, and welding settings.

20. The welding device as in claim 1, wherein said input is set to operate said welding device and to navigate and select data from a set of data files in a technical data base for use with welding technology.

21. The welding device as in claim 20, wherein said input device comprises a keyboard, a pointer device, a push-stick control member at least one rotating or sliding member with keying or switching functions.

22. The welding device as in claim 1, further comprising an output device for displaying a set of data that can be input by said input device, managed by said control and evaluation unit or retrieved by said computer network which can then be displayed on said output device.

23. The welding device as in claim 22, wherein said control and evaluation unit comprises a personal computer, and wherein said output device is in the form of a monitor.

24. The welding device as in claim 1, wherein said control and evaluation circuit has a JAVA interpreter.

25. The welding device as in claim 1, wherein said control and evaluation circuit has a JAVA processor.

26. The welding device as in claim 1, wherein said communications interface is a wireless communications interface that sets up a wireless data transmission route to a desired communication or transmission partner.

27. The welding device as in claim 1, wherein said communications interface is an infrared interface for transmitting and receiving infrared signals between said welding device and a mobile telephone.

28. The welding device as in claim 27, wherein said infrared interface of said communications interface is set to connect with an infrared interface of a mobile telephone.

29. The device as in claim 1, further comprising a programming and display unit wherein said communications interface connects directly with said programming and display unit.

30. The device as in claim 1 wherein said memory unit is an EEPROM memory unit for storing said set of instructions which include instructions relating to a sequencing software for said control and evaluation unit.

31. The device as in claim 1, further comprising a cooling unit for cooling said electrodes when the electrode reaches a temperature that exceeds a preset operating temperature.

32. The device as in claim 31, further comprising at least one flow indicator, wherein said flow indicator is in communication with said control and evaluation unit to control a temperature of said electrode.

33. A method for operating a welding device in communication with a computer network comprising a current source; a housing; a control and evaluation unit in communication with said current source disposed in said housing; a communications interface in communication with said control and evaluation unit disposed in said housing; at least one sensor system in communication with said communications interface, a web server disposed in said housing in communication with said communications interface, the method comprising the steps of:

supplying electrical energy from said current source to at least one electrode in communication with the current source;

monitoring a set of welding parameters of the welding unit during operation using the sensor system;

exchanging data in two directions between said control and evaluation unit and the computer network, via the communications interface, through a communications network, the information including said welding parameters, and forwarding this information onto said control and evaluation unit; and running at least one software module on said control and evaluation unit, wherein said at least one software module receives instructions in the form of data exchanged over the computer network to control a welding process and wherein said web server which is separate from said control and evaluation unit, transmits and receives data relating to said welding parameters.

34. The method as in claim 33, further comprising the step of:

transmitting codes across the computer network to control the software modules which are run by said control and evaluation unit.

35. The method as in claim 34, further comprising the step of:

transmitting operating data relating to operating supplies, and operating statuses including data relating to components susceptible to wear, a position of a contact sleeve, a position of a gas nozzle, through said communication interface through the communications network to another server on the network.

36. The method as in claim 35, further comprising the step of:

downloading servicing requirement messages and service requests including messages relating to stocks of operating supplies and orders for operating supplies from said control and evaluation unit to another server on the communication network.

37. The method as in claim 33, further comprising the step of:

downloading servicing requirement messages and service requests including messages relating to stocks of operating supplies and orders for operating supplies from said control and evaluation unit to another server on the communications network.

38. The method as in claim 33, wherein said communications network is in the form of the internet.

* * * * *